(12) United States Patent
Hughes (10) Patent No.: US 7,186,344 B2
(45) Date of Patent: Mar. 6, 2007

(54) MEMBRANE BASED FLUID TREATMENT SYSTEMS

(75) Inventor: Kenneth D. Hughes, Alpharetta, GA (US)

(73) Assignee: Water Visions International, Inc., Atlanta, GA (US)

( * ) Notice: Subject to any disclaimer, the term of this patent is extended or adjusted under 35 U.S.C. 154(b) by 0 days.

(21) Appl. No.: 10/125,073

(22) Filed: Apr. 17, 2002

(65) Prior Publication Data

US 2003/0196955 A1 Oct. 23, 2003

(51) Int. Cl.
*B01D 61/00* (2006.01)
*B01D 63/00* (2006.01)

(52) U.S. Cl. ............... 210/652; 210/650; 210/651; 210/660; 210/670; 210/681; 210/502.1

(58) Field of Classification Search ............... 210/679, 210/638, 258, 650–652, 501.2, 502.1, 660, 210/641, 195.2, 257.2, 663, 266, 282, 670, 210/681
See application file for complete search history.

(56) References Cited

U.S. PATENT DOCUMENTS

| | | | | |
|---|---|---|---|---|
| 3,442,796 A * | 5/1969 | Hayes | ............... | 208/139 |
| 3,996,131 A * | 12/1976 | Conn | ............... | 210/636 |
| 4,160,727 A * | 7/1979 | Harris, Jr. | ............... | 210/639 |
| 4,482,459 A * | 11/1984 | Shiver | ............... | 210/639 |
| 4,610,790 A | 9/1986 | Reti et al. | | |
| 4,623,467 A | 11/1986 | Hamlin | | |
| 4,670,150 A | 6/1987 | Hsiung et al. | | |
| 4,711,723 A * | 12/1987 | Bray | ............... | 210/652 |
| 4,806,244 A * | 2/1989 | Guilhem | ............... | 210/638 |
| 4,902,427 A * | 2/1990 | Szczepanik | ............... | 210/484 |
| 5,156,739 A * | 10/1992 | Dawson et al. | ............... | 210/321.8 |
| 5,238,574 A * | 8/1993 | Kawashima et al. | ............... | 210/652 |
| 5,266,203 A * | 11/1993 | Mukhopadhyay et al. | ............... | 210/638 |
| 5,589,066 A * | 12/1996 | Gray | ............... | 210/258 |
| 5,597,487 A * | 1/1997 | Vogel et al. | ............... | 210/652 |
| 5,635,071 A * | 6/1997 | Al-Samadi | ............... | 210/652 |
| 5,665,240 A * | 9/1997 | Hong | ............... | 210/665 |
| 5,670,053 A * | 9/1997 | Collentro et al. | ............... | 210/652 |
| 5,678,233 A * | 10/1997 | Brown | ............... | 588/313 |
| 5,926,771 A * | 7/1999 | Brown | ............... | 588/318 |
| 5,961,843 A | 10/1999 | Hayakawa et al. | | |
| 6,054,050 A * | 4/2000 | Dyke | ............... | 210/639 |
| 6,103,125 A * | 8/2000 | Kuepper | ............... | 210/637 |
| 6,106,725 A * | 8/2000 | Hong | ............... | 210/667 |
| 6,110,375 A * | 8/2000 | Bacchus et al. | ............... | 210/652 |
| 6,156,186 A | 12/2000 | Mueller et al. | | |
| 6,162,361 A * | 12/2000 | Adiga | ............... | 210/652 |
| 6,180,016 B1 | 1/2001 | Johnston et al. | | |
| 6,187,192 B1 * | 2/2001 | Johnston et al. | ............... | 210/502.1 |
| 6,187,200 B1 * | 2/2001 | Yamamura et al. | ............... | 210/652 |

(Continued)

FOREIGN PATENT DOCUMENTS

JP SHO 62204892 * 9/1987

*Primary Examiner*—Ana M. Fortuna
(74) *Attorney, Agent, or Firm*—Sutherland Asbill & Brennan LLP (57) ABSTRACT

A process for removing soluble and insoluble inorganic, organic, and microbiological contaminants from a fluid stream employing a pretreatment module, a post-treatment module, a recycle stream module or any combination thereof, and a membrane module, is provided. The process provided reduces the problems associated with membrane fouling and increases contaminant removal capacity.

64 Claims, 2 Drawing Sheets

U.S. PATENT DOCUMENTS 6,190,556 B1 * 2/2001 Uhlinger ..................... 210/636
6,274,041 B1 8/2001 Williamson et al.
6,395,678 B1 * 5/2002 Summers et al. ........... 502/416
6,461,514 B1 10/2002 Al-Samadi
6,506,935 B1 * 1/2003 Kulprathipanja et al. ... 562/608
6,607,668 B2 * 8/2003 Rela ........................ 210/321.6
6,821,435 B1 * 11/2004 Lindqvist et al. ........... 210/668
6,833,075 B2 * 12/2004 Hughes ....................... 210/679
6,861,002 B2 * 3/2005 Hughes ....................... 210/681
6,878,285 B2 * 4/2005 Hughes ....................... 210/663
7,011,753 B2 * 3/2006 Koslow ....................... 210/263

* cited by examiner

MEMBRANE BASED FLUID TREATMENT SYSTEMS

BACKGROUND OF THE INVENTION

1. Field of the Invention

This invention relates generally to a process for removing inorganic, organic, and microbiological contaminants from fluids. In its more particular aspects, the invention relates to the field of such devices that use membranes as one stage of a fluid treatment process. More particularly, a process for removing soluble and insoluble inorganic, organic, and microbiological contaminants from a fluid stream employing a pretreatment module, a post-treatment module, a recycle stream module or any combination thereof, and a membrane module, is provided. The process provided reduces the problems associated with membrane fouling and increases contaminant removal capacity

2. Description of Related Art

Purification of Water:

Purification or filtration of water or other aqueous solutions is necessary for many applications, from the provision of safe or potable drinking water to biotechnology applications including fermentation processing and separation of components from biological fluids, and to industrial processes that require waste stream treatment and recovery of process chemicals. Similarly, the removal of contaminants from fluids used in medical procedures and semiconductor fabrication processes, where ultrapurified fluids are required, and in environments where the fluids will be recirculated, such as aircraft or spacecraft, is also an important application for filtration and fluid treatment materials. In recent years, the need for water filtration and purification in the home has become more recognized, and the competing concerns of energy efficiency and residential fluid quality have lead to numerous filtration products, that purport to remove small particles, allergens, microorganisms, intentionally introduced biotoxins, pesticides, and toxic metals such as lead, mercury, and arsenic.

There are many well-known methods currently used for water purification, such as reverse osmosis, distillation, ion-exchange, chemical adsorption, coagulation, and filtering or retention. Particle filtration may be completed through the use of membranes or layers of granular materials. Other fluid purification techniques involve chemical introduction which alters the state or chemical identity of the contaminant. Examples of chemical additives include oxidizing agents, flocculating agents, and precipitation agents.

In many fluid purification applications a combination of techniques are required in order to completely purify fluids, such as water. Combinations of technologies may be implemented by combining functions in a single device or using several different devices and technologies in series where each performs a distinct function. Examples of this practice include the use of mixed ion-exchange resins that remove both negative and positively charged chemical species and oxidation/filtration methods where oxidizers are used to generate particulate matter that may be subsequently filtered.

The use of membrane materials in fluid treatment operations has become a mainstay of the field. Membrane filters are currently commercially available in single sheets or in multi-sheet formats which are spirally wound. Membranes can be generated with a range of pore sizes and pore size distributions, chemical surface functionalities, physical properties, and size. In combination, these properties determine the adequacy of the membrane for the application. Membranes are categorized with respect to pore size and include but are not limited to microfiltration membranes, ultrafiltration membranes, nanopore membranes, and reverse osmosis membranes. Microfiltration membranes are commonly used to remove insoluble particulate matter from fluid streams while reverse osmosis membranes and nanopore membranes are used to separate water from fluids which contain both water and dissolved organic and inorganic contaminants. These membranes can often be used to generate potable water from sea water.

It is well understood that as the pore size of the membrane decreases the problems with surface fouling increase. As example reverse osmosis membranes are subject to fouling from precipitated salts, adsorbed particulate matter including microorganisms, and from chemical degradation. Surface fouling results in dramatically decreased performance of the membrane in both contaminant removal and fluid passage through the membrane (permeate).

As a result, membranes with very small pore sizes, including nanopore and reverse osmosis membranes require prefilters which reduce contact with large insoluble particulate matter, careful control of raw water conditions, and in many cases repetitive cleaning operations.

Prefiltration technologies are known to prolong the lifetime of reverse osmosis membranes. Depending upon the membrane type both particulates and oxidizing chemicals such as water treatment introduced chlorine must be removed in a preliminary treatment step. When only particulate prefiltration is required it is common to use a string-wound prefilter. When both particulate and chlorine reduction is required activated carbon prefilters are used. Activated carbon filters are commercially available in both granular and block (molded or extruded) formats.

Membrane efficiency and contaminant rejection levels are however also related to the chemical and physical identity of the contaminant. Uncharged (neutral) and weakly charged contaminants are often poorly rejected by ultra, nanopore, and reverse osmosis membranes. Important examples of this situation include the low rejection levels of trivalent arsenic relative to pentavalent arsenic, and the lack of rejection of many chlorinated compounds originating from the water treatment disinfection process.

There is significant prior art in the field of water treatment systems employing reverse osmosis membranes. Specifically, there is significant art associated with the manufacture of membranes, pH adjustment of "raw" fluids through chemical injection before membrane introduction, the cleaning of membranes, the back flushing of membranes, and the design of automated and semi-automated treatment systems employing many variations of these procedures. Unfortunately, these modifications to the basic concept of pressurizing fluid against the membrane and collecting treated fluid from the low-pressure side of the membrane adds significant technical complexity and cost of operation, and decreases the safety associated with the process. As a result many water treatment systems comprised of nanopore, ultra, or reverse osmosis membranes coupled with advanced treatment technologies included for the purposes of extending membrane life and improving contaminant rejection are not suited for residential point-of-use or point-of-entry applications, and increasing are not suited for many industrial applications.

Accordingly one object of this invention is to provide a nanopore, ultra, and/or reverse osmosis membrane based water treatment system which employs inexpensive, safe, and reliable membrane pretreatment and post-treatment fluid conditioning. The process of the invention also serves to protect the membrane from particulate and chemical contaminants, improve the rejection level of some contaminants, and reduce the concentration of contaminants that are rejected poorly by the membrane, all of which are objects of the invention.

SUMMARY OF THE INVENTION

To this end, the present inventors have discovered that a significant problem in the treatment of fluids with nanopore, ultra, reverse osmosis and other extremely small pore size filtration membranes employed for the removal of soluble and insoluble inorganic, organic, and microbiological contaminants from a fluid stream is that the membrane must be protected from chemical attack and insoluble particulate exposure. Furthermore the inventors have discovered that a significant problem in the employment of technologies, methods, and processes for protecting, cleaning, and improving the function of the membrane is that they are costly, technically complex, and many times unsafe for individuals not trained in the field of water treatment to operate. This situation significantly decreases the sites where membrane technology can be applied.

In accordance with the invention the inventors have discovered that the use of inexpensive, safe, and operationally simple, pretreatment, post-treatment, and recycle stream treatment modules, can provide the membrane protection needed for extended membrane life, can increase the rejection level of specific problem contaminants, and reduce the concentration of contaminants that are poorly rejected by the membrane.

Furthermore, it has been discovered that the process of the invention can simultaneously reduce both chemical and microbiological contaminants to regulatory levels established by agencies such as the US EPA and the WHO.

With respect to the toxin arsenic it has been discovered that employing a single pretreatment module, reverse osmosis membrane module, and a post-treatment module that the dissolved metal contaminant trivalent arsenic can be reduced to levels required by the US EPA and the WHO.

Further, the present inventor has discovered that composite materials containing inexpensive solids originating from natural sources or synthetic sources or a combination thereof are capable of serving as sole components of, pretreatment, post-treatment, and recycle stream treatment modules.

Additionally, it has been recognized that the improvements provided by the inventive process allow fluid treatment membrane technology to be more widely applied, as example in residential settings.

This invention is in general a process for the purification and filtration of fluids, in particular aqueous fluids (such as drinking water or swimming or bathing water), or other aqueous solutions (such as fermentation broths, solutions used in cell culture, and in biotechnology applications), or in food and beverage applications. It may be used as a pretreatment in many industries including those which generate potable water, process semiconductor material, process industrial fluids, and which address environmental contamination. The process may be scaled easily.

The use of the process of the invention results in the removal of an extremely high percentage of contaminants, including trivalent arsenic species and water treatment chlorine compounds. In particular, the use of the device and method of the invention results in purification of water to a level that meets EPA, WHO, and NSF standards for designation as a water treatment device.

In one embodiment, the invention relates to a process employing a pretreatment module, a post-treatment module, a recycle stream treatment module, and a membrane module to create a water treatment system. Typically, the pretreatment, post-treatment, and recycle stream treatment module contains a composite material that provides particulate reduction, chemical oxidizer reduction, chemical contaminant modification, and microbiological organism and component reduction. The composite material used can be any one of the composites described by Water Visions International Inc. patents including that which is described in U.S. Pat. No. 6,187,192. Additionally it may include composites generated from fluid treatment carbon, metal phosphates, metal oxides, reduced metals, silicates, metal sulfates, metal carbonates, silicates, metal hydroxides, or combinations thereof. Even furthermore it may include composites prepared from fluid treatment carbon, metal phosphates, metal oxides, reduced metals, silicates, metal sulfates, metal carbonates, silicates, metal hydroxides, or combinations thereof in the form of a porous block as the result of the presence of a binder.

In another embodiment, the invention relates to a process comprised of using, a pretreatment module, a post-treatment module, and a membrane module to create a water treatment system. Typically, the pretreatment and post-treatment modules contain a composite material that provides particulate reduction, chemical oxidizer reduction, chemical contaminant modification, and microbiological organism and component reduction. The composite material used can be any one of the composites described by Water Visions International Inc. patents including that which is described in U.S. Pat. No. 6,187,192. Additionally it may include composites generated from fluid treatment carbon, metal phosphates, metal oxides, reduced metals, silicates, metal sulfates, metal carbonates, silicates, metal hydroxides, or combinations thereof. Even furthermore it may include composites prepared from fluid treatment carbon, metal phosphates, metal oxides, reduced metals, silicates, metal sulfates, metal carbonates, silicates, metal hydroxides, or combinations thereof in the form of a porous block as the result of the presence of a binder.

In another embodiment, the invention relates to a process comprised of using, a pretreatment module, and a membrane module to create a water treatment system. Typically, the pretreatment contains a composite material that provides particulate reduction, chemical oxidizer reduction, chemical contaminant modification, and microbiological organism and component reduction. The composite material used can be any one of the composites described by Water Visions International Inc. patents including that which is described in U.S. Pat. No. 6,187,192. Additionally it may include composites generated from fluid treatment carbon, metal phosphates, metal oxides, reduced metals, silicates, metal sulfates, metal carbonates, silicates, metal hydroxides, or combinations thereof. Even furthermore it may include composites prepared from fluid treatment carbon, metal phosphates, metal oxides, reduced metals, silicates, metal sulfates, metal carbonates, silicates, metal hydroxides, or combinations thereof in the form of a porous block as the result of the presence of a binder.

In another embodiment, the composite contained in the pretreatment module, post-treatment module, or recycle stream treatment module, and any combination thereof also contains material filter wraps with porosities that are greater than that provided by the composite material. Typically, these are natural or synthetic materials including but not limited to cotton and polyethylene respectively.

In another embodiment, the pretreatment module, post-treatment module, or recycle stream treatment module, and any combination thereof are present in units greater than one and arranged in a series or parallel flow configuration.

In another embodiment, the pretreatment module, post-treatment module, or recycle stream treatment modules, and any combination thereof are used with multiple membrane units.

In another embodiment, the post-treatment module is located after a storage tank, bladder or other fluid depository and before the end use application.

The process of the invention relates to filtering fluids, such as water, aqueous solutions, to convert/reduce a large proportion of one or more types of chemical species contained therein, by contacting the fluid with the treatment modules of the process.

In a particular aspect of this embodiment of the invention, this contacting occurs within the module which is typically a standard housing which efficiently contains the fluid treatment materials and eliminates fluid bypass around the fluid treatment material, with the unfiltered fluid flowing through an inlet, contacting the purification material in one or more chambers, and the filtered fluid flowing out of the chamber through an outlet.

The purification material of the invention can be used to purify drinking water, to purify water used for recreational purposes, such as in swimming pools, hot tubs, and spas, to purify process water, e.g. water used in cooling towers, to purify aqueous solutions, including but not limited to, fermentation broths and cell culture solutions (e.g., for solution recycling in fermentation or other biotechnology processes) and aqueous fluids used in surgical procedures for recycle or reuse.

The process of the invention has the additional advantage of making use of readily available mineral materials, including those obtained from natural sources, for inclusion in the treatment modules.

In yet another embodiment of the invention, the material of the invention, namely minerals and optionally other adsorptive and buffering materials in a binder matrix and formed into a block or sheet, can be used as a medium for converting chemical species used in biotechnology applications such as fermentation processes and cell culture and in semiconductor operations. In this embodiment, biological process fluids, such as nutrient broths, substrate solutions, and the like, are passed through the treatment material of the invention in a manner that allows the fluids to come into contact with the chemical species immobilized therein, and effluent removed from the material and further processed as needed.

DETAILED DESCRIPTION OF THE INVENTION

As indicated above, one embodiment of the invention relates to a process comprised of using, a pretreatment module, a post-treatment module, and a membrane module to create a water treatment system. Typically, the pretreatment, post-treatment, and membrane modules are housings with a fluid inlet and an outlet, which contains a composite material that provides particulate reduction, chemical oxidizer reduction, chemical contaminant modification, and microbiological organism and component reduction. Nonlimiting examples of chemical contaminants that may be removed by the present methods and systems include chlorine-containing oxidizers, manganese-containing oxidizers, and peroxide-containing oxidizers. Non-limitin examples of chemical contaminants that may be reduced by the present methods and systems include hydrocarbons and sulfur-containing compounds, such as hydrogen sulfide.

A more preferred embodiment of the invention relates to a pretreatment module, and a post-treatment module containing a composite material in the form of a block filter and wrapped with filter sheet material with a larger pore size containing fluid treatment carbon, metal phosphates, metal oxides, reduced metals, silicates, metal sulfates, metal carbonates, silicates, metal hydroxides, or combinations thereof in a binder, which is typically a polymeric material. In a particular aspect of this embodiment, the invention relates to a block filter that contains a mixture of granulated phosphate minerals, silicates, iron in oxide, hydroxide, or reduced metal form or a combination thereof and granulated activated charcoal (GAC) or bone charcoal or other adsorptive filter media in a binder material, such as a thermoplastic of fluid swellable material, such that the mineral derivatives and GAC and/or bone charcoal are fixed within the binder matrix, and that channeling from flow during water treatment cannot occur.

In another particular aspect of this embodiment, the invention relates to a rigid block filter that contains a mixture of silicate minerals and aluminum oxides, titanium oxides, iron oxides, and granulated activated charcoal (GAC) or bone charcoal, bauxite, or other adsorptive filter media in a binder material, such as a thermoplastic material or fluid swelling material, such that the silicate and aluminum, iron and titanium containing minerals and derivatives and GAC and/or bone charcoal are fixed within the binder matrix, and that channeling from flow during water treatment cannot occur.

The pore size of the composites materials used in the pretreatment module, a post-treatment module, and recycle stream treatment module influences flow rates of the fluid through the module, and is a function of the size of the granular particles and in the case of block composites additionally the amount of binder present. As used herein, the term "block" does not denote any particular geometrical shape, but rather that the material is not a sheet or membrane. Nonlimiting examples of "blocks" as this term is intended to be used include tubes, annular rings, as well as more conventional geometrical solids. Material formed into flexible blocks is particularly suitable for use in pipes or tubes that serve as the filter medium contained in the pretreatment module, post-treatment module, or recycle stream treatment module.

One of the desirable features of the process of the invention is that the pretreatment module, a post-treatment module, a recycle stream treatment module it may be formed into any desired shape, and thus provides ease of handling and use. Additionally multiple units of treatment may be used. Additionally, the use of pretreatment module, a post-treatment module, a recycle stream treatment module allows the use of composite materials in the form of sheets.

Those familiar with the art of fluid filtration will understand that the pore size and physical dimensions of the treatment materials contained in the pretreatment module, post-treatment module, or recycle stream treatment module may be manipulated for different applications and that variations in these variables will alter flow rates, backpressure, and the level of chemical and microbiological contaminant removal. Likewise those knowledgeable in the art will recognize that variations in the percentages of each component of the purification material will provide some variability in utility. For example, increasing the percentage of carbon in the filtration material contained in the pretreatment module, post-treatment module, and/or recycle stream treatment module will result in a module having an increased capacity for chlorine removal, while increasing the amount of zeolite or softening agent will increase the removal of divalent and trivalent hardness ions.

In one particular embodiment of the invention, the complex composite used in the pretreatment module, post-treatment module, and recycle stream treatment module is derived from the processing of animal bones (bone charcoal) and the processing of natural materials to generate a GAC material. The bone charcoal, which is a complex mixture after processing of phosphates, sulfates, carbonates, silicates, and reduced metals and the GAC are present in approximately equal amounts, with the percentage of binder material kept to a minimum. However, the mineral mixture used in the invention may be generated or obtained from other natural or synthetic/industrial sources and mixtures of the different derivatives can provide differences in the properties of the purification material. For example, adding calcium carbonate to the module can decrease the acid concentration in the effluent water if water is used as the fluid. This can be useful in, e.g. neutralizing acidic water in such a way as to maintain desirable water pH levels therein. The carbonate species in the filter material may be obtained either by inclusion of alkali and alkaline earth salts or metal based salts such as those containing titanium, manganese and iron, inclusion of other carbonate salts and compounds, or by pre-conditioning the purification material by passing reactive carbonate-containing solutions therethrough.

Those experienced in the art will also understand that many different pH injection, cleaning agent injections, and back-flushing operations may be used in addition to the pretreatment module, post-treatment module, and recycle stream treatment module. Furthermore, those experienced in the art will also understand that many of these processes employed in addition to the pretreatment module, post-treatment module, and recycle stream treatment module may be automated or semi-automated.

Furthermore, those experienced in the art will also understand that many different membranes may be used in the membrane module and that the actual membrane is not in itself an object of the invention. Membranes can include any natural or synthetic material, treated or treated which provides a separation function for soluble or insoluble components of fluid streams.

Even furthermore, those experienced in the art will also understand that various pumps with varying output volumes and pressures, distribution conduits, valves, sampling ports, and other plumbing fixtures and components are useful in the operation of membrane containing water treatment systems and that use and arrangement of these components does not provide any significant deviation from the spirit of the inventive process.

In another embodiment of the invention, the pretreatment module, a post-treatment module, and recycle stream treatment module are constructed to withstand sterilization. Sterilization processes include thermal processes, such as steam sterilization or other processes wherein the purification material is exposed to elevated temperatures or pressures or both, resistive heating, radiation sterilization wherein the pretreatment module, a post-treatment module, or recycle stream treatment module is exposed to elevated radiation levels, including processes using ultraviolet, infrared, microwave, and ionizing radiation, and chemical sterilization, wherein the purification material is exposed to elevated levels of oxidants or reductants or other chemical species, and which is performed with chemicals such as halogens, reactive oxygen species, formaldehyde, surfactants, metals and gases such as ethylene oxide, methyl bromide, beta-propiolactone, and propylene oxide.

Additionally, sterilization may be accomplished with electrochemical methods by direct oxidation or reduction with microbiological components or indirectly through the electrochemical generation of oxidative or reductive chemical species. Combinations of these processes are also used on a routine basis. It should also be understood that sterilization processes may be used on a continuous or sporadic basis while the purification material is in use.

In general, the invention comprises a process for fluid treatment, in particular an aqueous solution or water, to remove organic and inorganic elements and compounds present in the water as particulate or soluble entities. In particular, the process can be used to remove chemical and microbiological contaminants, including heavy metals such as arsenic, bacteria, and viruses and components thereof, from water or other fluids destined for consumption or other use by humans or other animals. The process of the invention is particularly useful in these applications where the reduction in concentration of chemical and microbiological contaminants made possible by the invention meets WHO, EPA, and NSF standards for water purification devices.

Figure 1:
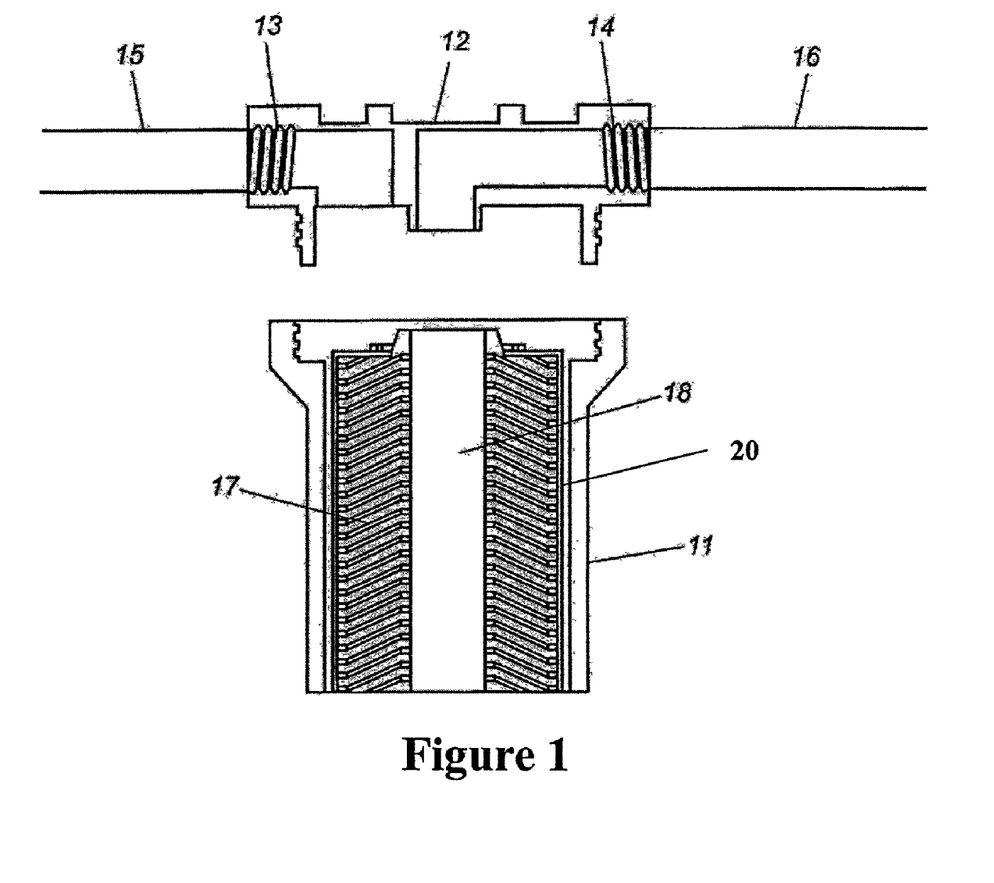
FIG. 1 is an illustration noting some of the components of the inventive process.

With reference to the drawings, the process of the invention and a mode of operation will now be described with regard to one particular embodiment, which employs a pretreatment module, a post-treatment module, a recycle stream module and a membrane module. FIG. 1 illustrates a typical specific embodiment of a water treatment system employing a pretreatment module 2, a post-treatment module 4, a recycle stream module 5, and a membrane module 3. In this particular embodiment the pretreatment module, post-treatment module, and recycle stream module are single housings containing a single rigid porous block filter.

Figure 2:
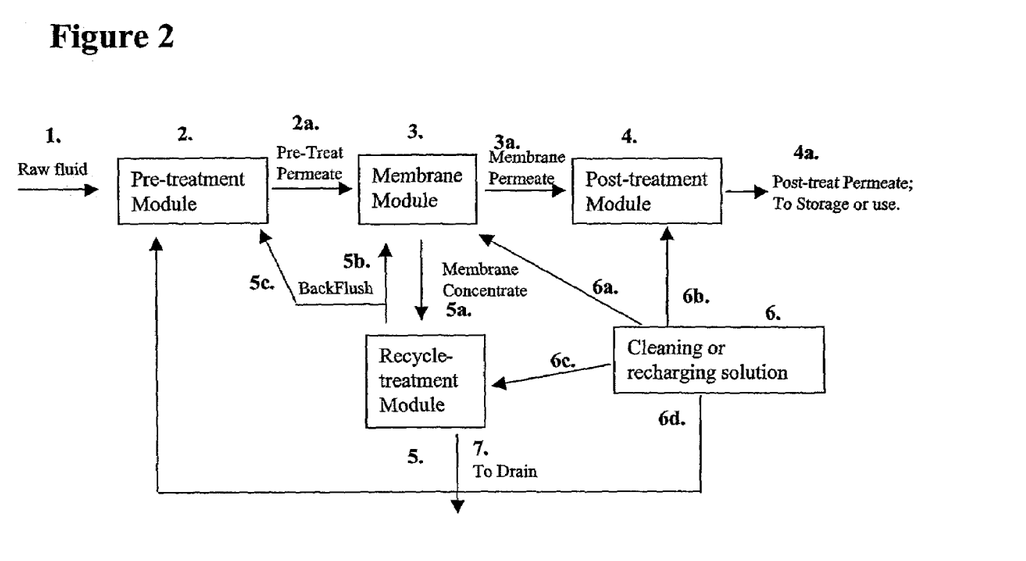
FIG. 2 is a schematic view of a fluid treatment material containing fluid treatment carbon, metal phosphates, metal oxides, reduced metals, metal silicates, metal sulfates, metal carbonates, metal hydroxides or a combination thereof and a binder matrix in the form of a block which is wrapped in two different polyethylene membrane materials with porosities greater than the composite block, which is contained in a housing and is a component in a pretreatment module, a post treatment module, a recycle treatment module or a combination thereof.

FIG. 2 illustrates the construction of a treatment module. Specifically, a removable housing 11 is mated with a cap 12, the cap 12 having an inflow orifice 13 and an outflow orifice 14. A water supply conduit 15 is joined to the inflow orifice 13 to deliver non-treated water into the device, and a water discharge conduit 16 is joined to the outflow orifice 14 to conduct treated water from the device. Water passes into the housing 11. The pressure of the water flow forces it through the porous block filter 17 and filter sheets 20, which as shown is formed in the shape of hollow cylinder with an axial bore 18. The treated water then passes into the axial bore 18 which connects to the outflow orifice 14. FIG. 2 is provided as a representative illustration of one possible configuration. It is to be understood that other configurations where water is caused to pass through a porous filter block 17, a composite filter sheet, multiple blocks and/or sheets and combination thereof (which may have different geometrical shapes and/or different flow properties) are contemplated to be within the scope of the invention. The block 17 may be formed by any of a number of known methods, such as by extrusion, compression, molding, sintering, material swelling pressure or other techniques.

In the operation of the process, as illustrated in FIG. 1, a raw fluid stream 1, is passed into contact with the high pressure side of the pretreatment module 2. The fluid exiting the low pressure side of the pretreatment module is the pretreatment permeate 2a. This pretreatment permeate is a fluid with reduced particulate and chemical contaminant concentrations as a result of exposure to the pretreatment module. The pretreatment permeate 2a is then stored for further processing or immediately passed into contact with the high pressure side of a membrane module 3. During exposure to the membrane module 3, the fluid is separated into a membrane permeate 3a and a membrane concentrate 5a, with the membrane permeate having significantly reduced contaminate levels than the influent fluid stream while the membrane concentrate 5a, will have a contaminant level that is higher than both the influent stream 2a and the membrane permeate 3a. The membrane permeate once collected from the low pressure side of the membrane module 3, is stored or immediately passed into contact with the high pressure side of the post-treatment module 4. The post treatment permeate 4a may contain even more reduced levels of contaminants than the membrane permeate 3a. This is contaminant specific. The membrane concentrate 5a, collected from the high pressure side of the membrane, is stored or immediately passed into contact with the high pressure side of the recycle treatment module 5. Fluid collected from the low pressure side of the recycle treatment module 5 maybe passed directly to drain 7, or recycled to the membrane module 3, combining with pretreatment permeate 2a or it may be used to back-flush membrane module 3 as a fluid stream 5b, or used to back-flush pretreatment module 2, as a third fluid stream 5c. After back-flushing, fluids originating as streams 5b and 5c may be sent directly to drain 7. Likewise any of the fluids stored such as 2a, 3a, or 4a may be used to back flush any of the treatment modules. In practice fluid streams with reduced levels of contaminants are often used for back-flushing. A tank or housing containing cleaning or recharging solutions 6, may be used to generate cleaning fluid streams 6a–6d as indicated for any one or all of the treatment modules. Raw fluid 1, may be a fluid that has undergone a prior treatment stage. Furthermore it should be understood that the dosing of chemicals at any stage of the operation, as example between the pretreatment and membrane modules and between recycle treatment and membrane modules is possible and anticipated.

EXAMPLE 1

Raw water with the following composition, arsenic(III) 0.058 mg/L; calcium 40 mg/L; fluoride 1 mg/L; magnesium 12 mg/L; nitrate 2 mg/L; pH=8.5; sulfate 50 mg/L; and phosphorus 0.04 mg/L. was used to demonstrate the effectiveness of the inventive process.

As noted in FIG. 1, a preferred embodiment of the inventive process involves the use of a pretreatment module, a membrane module, and a post-treatment module. Both the pretreatment module and post-treatment module house a cylindrical filter block (FIGS. 2–17) which may be prepared with a material composition of approximately 42.5% bone charcoal obtained from Brimac Carbon Industries, approximately 42.5% GAC obtained from KX Industries, and approximately 15% thermoplastic binder material. This bone charcoal includes a mineral mixture that contains varying amounts of metal phosphates including iron, metal silicates, metal sulfates including calcium, metal carbonates including calcium, metal hydroxides, or combinations thereof.

The material may then be extruded at a temperature that provides a uniform mixture of bone charcoal, GAC, and thermoplastic binder. The cylindrical or toroidally shaped block FIGS. 2–17 is approximately 9.8 inches in length, with an outer diameter of approximately 2.5 inches and an inner diameter (the bore FIGS. 2–18) of approximately 1.25 inches. This shape filter fits into a standard water filtration housing used in the home and industrial settings. The filter material has a resistance of about 300 Ω.

In this example a single filter material block and housing serves as a pretreatment module. Likewise, a single filter material block and housing serves as a post-treatment module. The pretreatment module was tested for particulate reduction and reduced particles 5 micron and larger by more than 95%.

The membrane module plumbed between the pretreatment module and post treatment module is manufactured by EcoWater Inc. (St. Paul, Minn.) and is commercially available at home improvement retail outlets. The semi-permeable reverse osmosis membrane contained in this module is constructed of polyamide and the module is rated at 10 gallons per day at standard residential line pressures.

This process described in this example, namely a pretreatment module, membrane module, and post-treatment module reduced trivalent arsenic concentrations greater than 90% for over three days of operation. For comparison a similar water treatment system containing a reverse osmosis membrane and a pretreatment activated carbon filter and a post-treatment activated carbon filter provided a much lower capacity to reduce the concentration of trivalent arsenic.

As described above, the process of the invention is extremely useful in the area of water purification, particularly the area of drinking water purification. In addition to functioning as a purifier for drinking water, the material of the invention can also be used to treat fluids used for food processing purposes and industrial wastewater stream processing such as water used in hydrocarbon processing and semiconductor processing. As the result of the ability of the invention to efficiently react with chemical species such as trivalent arsenic and chlorine in aqueous solutions, it has numerous applications in the pharmaceutical and medical fields. For example, the material of the invention can be used in the preparation of pharmaceuticals and to purify fluids that contact physiological fluids such as blood.

The material can also be used in industrial fields where treatment of fluids that result from mining activities is required.

The process of the invention has numerous other industrial uses, e.g., treating water used in cooling systems. Cooling water often passes through towers, ponds, or other process equipment where heavy metals are leached into the fluid stream as a result of metal component contact with the fluid. By reducing the concentration of heavy metals, the present invention helps to reduce the health hazard associated with the cooling fluids and the cost and dangers associated with chemical treatment programs, and reduces the cost of waste disposal or liquid discharges.

In each of these applications, the method of the invention is relatively simple and should be apparent to those of skill in the fluid treatment art. The fluid to be filtered is simply conducted to one side of pretreatment module or post-treatment module of the invention, typically disposed in some form of housing, and forced through the modules as the result of a pressure drop across the composite materials. Purified, filtered fluid is then conducted away from the "clean" side of the filter and further processed by the membrane module or used.

The invention having been thus described by reference to certain of its specific embodiments, it will be apparent to those of skill in the art that many variations and modifications of these embodiments may be made within the spirit of the invention, which are intended to come within the scope of the appended claims and equivalents thereto.

What is claimed is:

1. A process for treating a fluid stream containing soluble and insoluble organic and inorganic chemical contaminants, microbiological contaminants, or combinations thereof to reduce the concentration of these contaminants comprising:
   passing the fluid stream through a pretreatment module to reduce both soluble and insoluble contaminants and to convert soluble contaminants into other forms present therein, the pretreatment module including a filtering medium which comprises bone charcoal or bauxite;
   recovering from the pretreatment module a treated stream;
   passing the treated stream through a membrane module to remove additional insoluble and soluble chemical and microbiological contaminants present therein; and
   recovering from the membrane module a membrane permeate,
   wherein at least one of the contaminants removed by the process is a manganese containing oxidizer or a peroxide containing oxidizer.

2. A process for treating a fluid stream containing soluble and insoluble organic and inorganic chemical contaminants, microbiological contaminants, or combinations thereof to reduce the concentration of these contaminants comprising:
   passing the fluid stream through a pretreatment module to reduce both soluble and insoluble contaminants and to convert soluble contaminants into other forms present therein, the pretreatment module including a filtering medium which comprises bone charcoal or bauxite;
   recovering from the pretreatment module a treated stream;
   passing the treated stream though a membrane module to remove additional insoluble and soluble chemical and microbiological contaminants present therein; and
   recovering from the membrane module a membrane permeate,
   wherein at least one of the contaminants reduced by the process is a sulfur containing compound or a hydrocarbon.

3. A process for treating a fluid stream containing soluble and insoluble organic and inorganic chemical contaminants, microbiological contaminants, or combinations thereof to reduce the concentration of these contaminants comprising:
   passing the fluid stream through a pretreatment module to reduce both soluble and insoluble contaminants and to convert soluble contaminants into other forms present therein, the pretreatment module including a filtering medium which comprises bone charcoal or bauxite;
   recovering from the pretreatment module a treated stream;
   passing the treated stream through the membrane module to remove additional insoluble and soluble chemical and microbiological contaminants present therein; and
   recovering from the membrane module a membrane permeate,
   wherein at least one of the contaminants reduced by the process is hydrogen sulfide.

4. A process for treating a fluid stream containing soluble and insoluble organic and inorganic chemical contaminants, microbiological contaminants, or combinations thereof to reduce the concentration of these contaminants comprising:
   passing the fluid stream through a pretreatment module to reduce both soluble and insoluble contaminants and to convert soluble contaminants into other forms present therein, the pretreatment module including a filtering medium which comprises rises bone charcoal or bauxite fixed within a binder matrix;
   recovering from the pretreatment module a treated stream;
   passing the treated stream though a membrane module to remove additional insoluble and soluble chemical and microbiological contaminants present therein;
   recovering from the membrane module a membrane permeate; and
   adjusting the pH of the fluid stream before the pretreatment module.

5. A process for treating a fluid stream containing soluble and insoluble inorganic and organic chemical contaminants, microbiological contaminants, or combinations thereof to reduce the concentration of these contaminants comprising:
   passing the fluid stream through a pretreatment module to reduce both soluble and insoluble contaminants and to convert soluble contaminants into other forms present therein, the pretreatment module including a filtering medium which comprises bone charcoal or bauxite;
   recovering from the pretreatment module a treated stream;
   passing the treated stream through a membrane module to remove additional insoluble and soluble chemical and microbiological contaminants present therein; and
   recovering from the membrane module a membrane permeate,
   wherein at least one of the contaminants are reduced by the pretreatment module to an oxidation state to effectuate removal of said at least one of the contaminants by the membrane module; and
   wherein (i) the contaminant removed is a chlorine-containing oxidizer, a manganese-containing oxidizer, or a peroxide-containing oxidizer, or (ii) the contaminant reduced is a sulfur-containing compound or a hydrocarbon.

6. The process of claim 5, wherein the filtering medium is bone charcoal.

7. The process of claim 5, wherein the filtering medium is bauxite.

8. The process of claim 5 further comprising passing the membrane permeate through the post-treatment module to reduce soluble contaminants which pass through the membrane module, and to recover from the post-treatment module a post-treatment stream which may be used.

9. The process of claim 8, further comprising the step of backwashing with a recharge solution the pretreatment module, the post-treatment module, the membrane module, or a combination thereof.

10. The method of claim 8, wherein the post-treatment module comprises a filtering medium comprising bone charcoal, one or more of the individual components contained in bone charcoal, bauxite, or one or more of the individual components contained in bauxite.

11. The process of claim 5, wherein a membrane concentrate stream is recycled from a high pressure side of the membrane module to a high pressure side of the pretreatment module.

12. The process of claim 5, wherein a membrane concentrate stream is recycled from a high pressure side of the membrane module to a high pressure side of a membrane module.

13. The process of claim 5, wherein a membrane concentrate stream is recycled from a high pressure side of the membrane module to a high pressure side of a recycle treatment module.

14. The process of claim 13, further comprising adjusting the pH of the fluid stream between the recycle treatment module and the membrane module.

15. The process of claim 13, further comprising adjusting the pH of the fluid stream between the recycle treatment module and the pretreatment module.

16. The process of claim 5, wherein the contaminant removed is a metal.

17. The process of claim 16, wherein the metal is arsenic.

18. The process of claim 17, wherein the arsenic metal is in a trivalent state.

19. The process of claim 17, wherein the arsenic metal is in a pentavalent state.

20. The process of claim 16, wherein the metal is iron.

21. The process of claim 20, wherein the iron metal is in the divalent state.

22. The process of claim 16, wherein the metal is cadmium.

23. The process of claim 5, wherein the contaminant removed is a chlorine containing oxidizer.

24. The process of claim 5, wherein the contaminant removed is a manganese containing oxidizer.

25. The process of claim 5, wherein the contaminant removed is a peroxide containing oxidizer.

26. The process of claim 5, wherein the contaminant reduced is a sulfur containing compound.

27. The process of claim 26, wherein the contaminant reduced is hydrogen sulfide.

28. The process of claim 5, wherein the contaminant reduced is a hydrocarbon.

29. The process of claim 28, wherein said hydrocarbon is from a petroleum-related waste stream.

30. The process of claim 5 further comprising adjusting the pH of the fluid stream before the pretreatment module.

31. The process of claim 5 further comprising adjusting the pH of the fluid stream between the pretreatment module and the membrane module.

32. The process of claim 5 further comprising passing the fluid stream through at least one turbidity reduction filter prior to the pretreatment module.

33. The process of claim 5, wherein the membrane module comprises a microfiltration membrane.

34. The process of claim 5, wherein the membrane module comprises a nanofiltration membrane.

35. The process of claim 5, wherein the membrane module comprises an ultrafiltration membrane.

36. The process of claim 5, wherein the membrane module comprises a reverse osmosis membrane.

37. The process of claim 5, further comprising passing the membrane permeate through at least one additional membrane module, wherein the membrane modules are arranged in series.

38. The process of claim 5, further comprising passing the treated stream through at least one additional membrane module, wherein the membrane modules are arranged in parallel.

39. The process of claim 5 further comprising cleaning or modifying the membrane module with a membrane cleaning or modifying solution.

40. The process of claim 5, wherein the pretreatment module further contains oxides of iron, titanium, or silicon.

41. The process of claim 5, wherein the pretreatment module further contains aluminosilicates and zeolites.

42. The process of claim 5, wherein the pretreatment module further contains calcium phosphates.

43. The process of claim 42, wherein the pretreatment module further contains calcium phosphate in an apatite structure.

44. The process of claim 5, wherein the pretreatment module further contains calcium carbonates.

45. The process of claim 5, wherein the pretreatment module further contains one or more of the individual components contained in phosphate rock.

46. The process of claim 5, wherein the pretreatment module further contains manganese containing silicates.

47. The process of claim 5, wherein the pretreatment module further contains iron phosphates, iron carbonates, iron silicates or combinations thereof.

48. The process of claim 5, wherein the pretreatment module further contains zirconium phosphates.

49. The process of claim 5, wherein the pretreatment module further contains activated carbon as a component of a composite matrix.

50. The process of claim 5, wherein the pretreatment module further contains copper metal or an alloy of copper metal.

51. The process of claim 5, wherein the pretreatment module further contains iron metal or an alloy of iron metal.

52. The process of claim 5 further comprising the step of backwashing the pretreatment module, the membrane module, or a combination thereof to extend the life thereof using a reservoir or fluid stream originating from a low-pressure side of the pretreatment module, the membrane module, or a combination thereof.

53. The process of claim 5, wherein the fluid treatment system is used in residential point of use applications.

54. The process of claim 5, wherein the fluid treatment system is used in residential point of entry applications.

55. The process of claim 5, wherein the fluid treatment system is used in institutional, military, or industrial applications.

56. The process of claim 5, wherein the fluid treatment system is used in pharmaceutical applications.

57. The process of claim 5, wherein the fluid treatment system is used in medical applications.

58. The process of claim 5, wherein the fluid treatment system is used in semiconductor applications.

59. The process of claim 5, further comprising the step of cleaning or recharging the pretreatment module, the membrane module or a combination thereof by passing a module cleaning solution or module regenerative solution through the pretreatment module, the membrane module, or a combination thereof.

60. The process of claim 5 further comprising sterilizing the pretreatment module, the membrane module, or a combination thereof.

61. A process for treating a fluid stream containing soluble and insoluble organic and inorganic chemical contaminants, microbiological contaminants, or combinations thereof to reduce the concentration of these contaminants comprising:
passing the fluid stream through a pretreatment module to reduce both soluble and insoluble contaminants and to convert soluble contaminants into other forms present therein, the pretreatment module including a filtering medium which comprises bone charcoal, bauxite, or one or more components of bone charcoal or bauxite;

recovering from the pretreatment module a treated stream;

passing the treated stream through a membrane module to remove additional insoluble and soluble chemical and microbiological contaminants present therein; and recovering from the membrane module a membrane permeate, wherein at least one of the contaminants are reduced by the pretreatment module to an oxidation state to effectuate removal of said at least one of the contaminants by the membrane module; and wherein the pretreatment module further includes a calcium phosphate, a calcium carbonate, at least one component of phosphate rock, a manganese-containing silicate, an iron phosphate, an iron carbonate, an iron silicate, a zirconium phosphate, a copper metal, an alloy of copper metal, an iron metal, an alloy of iron metal, or a combination thereof.

62. A process for treating a fluid stream containing soluble and insoluble organic and inorganic chemical contaminants, microbiological contaminants, or combinations thereof to reduce the concentration of these contaminants comprising:

passing the fluid stream through a pretreatment module to reduce both soluble and insoluble contaminants and to convert soluble contaminants into other forms present therein, the pretreatment module including a filtering medium which comprises bone charcoal or bauxite fixed within binder matrix;

recovering from the pretreatment module a treated stream;

passing the treated stream through a membrane module to remove additional insoluble and soluble chemical and microbiological contaminants present therein; and recovering from the membrane module a membrane permeate, wherein at least one of the contaminants are reduced by the pretreatment module to an oxidation state to effectuate removal of said at least one of the contaminants by the membrane module; and wherein the pretreatment module contains a prefilter sheet material.

63. The process of claim 62, wherein the prefilter sheet material has a pore size distribution greater than that of the composite filtering medium.

64. The process of claim 62, wherein the prefilter sheet material has a pore size distribution smaller than that of the composite.

* * * * *